United States Patent
Suzuki et al.

(10) Patent No.: US 11,539,863 B2
(45) Date of Patent: Dec. 27, 2022

(54) COLOR CHART, IMAGE FORMING APPARATUS, AND READING DEVICE

(71) Applicants: Rie Suzuki, Kanagawa (JP); Tatsuya Ishii, Kanagawa (JP)

(72) Inventors: Rie Suzuki, Kanagawa (JP); Tatsuya Ishii, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/478,964

(22) Filed: Sep. 20, 2021

(65) Prior Publication Data
US 2022/0109780 A1 Apr. 7, 2022

(30) Foreign Application Priority Data

Oct. 6, 2020 (JP) .............................. JP2020-169067

(51) Int. Cl.
*H04N 1/60* (2006.01)
*H04N 1/00* (2006.01)

(52) U.S. Cl.
CPC ....... *H04N 1/6033* (2013.01); *H04N 1/00819* (2013.01); *H04N 1/6005* (2013.01); *H04N 1/6008* (2013.01)

(58) Field of Classification Search
CPC combination set(s) only.
See application file for complete search history.

(56) References Cited

U.S. PATENT DOCUMENTS

| 6,377,330 B1 * | 4/2002 | Vanderbrook ....... H04N 1/6094 355/71 |
| 6,750,993 B1 | 6/2004 | Shirai |
| 2010/0214581 A1 | 8/2010 | Shiraki et al. |
| 2011/0176155 A1 * | 7/2011 | Toriyabe .............. H04N 1/4015 358/1.9 |
| 2011/0310411 A1 * | 12/2011 | Hirano ................. H04N 1/6058 358/1.9 |
| 2012/0162649 A1 | 6/2012 | Ishizaki et al. |
| 2013/0027720 A1 * | 1/2013 | Satoh ...................... H04N 1/60 358/1.9 |

(Continued)

FOREIGN PATENT DOCUMENTS

| EP | 1 081 939 A2 | 3/2001 |
| JP | 2012-147411 | 8/2012 |

OTHER PUBLICATIONS

Extended European Search Report dated Dec. 9, 2021 in European Patent Application No. 21194760.1, 8 pages.

*Primary Examiner* — Barbara D Reinier
(74) *Attorney, Agent, or Firm* — Xsensus LLP

(57) ABSTRACT

A color chart includes a first portion and a second portion. The first portion includes no patch. The second portion includes a plurality of patches having different densities or luminances. The plurality of patches includes a reference patch indicating a color having a reference density or luminance. The reference patch is adjacent to the first portion. The plurality of patches is located in order of increasing density from the density of the color indicated by the reference patch, decreasing density from the density of the color indicated by the reference patch, increasing luminance from the luminance of the color indicated by the reference patch, or decreasing luminance from the luminance of the color indicated by the reference patch.

12 Claims, 18 Drawing Sheets

(56) References Cited

U.S. PATENT DOCUMENTS

| | | | |
|---|---|---|---|
| 2014/0176970 A1* | 6/2014 | Iguchi | H04N 1/6033 |
| | | | 358/1.9 |
| 2016/0173715 A1 | 6/2016 | Suzuki et al. | |
| 2016/0182753 A1 | 6/2016 | Takahashi et al. | |
| 2020/0099812 A1 | 3/2020 | Ishii | |
| 2021/0218860 A1 | 7/2021 | Nikaku et al. | |

* cited by examiner (a) (b)

COLOR CHART, IMAGE FORMING APPARATUS, AND READING DEVICE

CROSS-REFERENCE TO RELATED APPLICATION

This patent application is based on and claims priority pursuant to 35 U.S.C. § 119(a) to Japanese Patent Application No. 2020-169067, filed on Oct. 6, 2020, in the Japan Patent Office, the entire disclosure of which is hereby incorporated by reference herein.

BACKGROUND

Technical Field

Embodiments of the present disclosure relate to a color chart, an image forming apparatus, and a reading device.

Related Art

There is known a technique of performing, with a color chart, quality adjustment, particularly color reproduction density adjustment, on an image forming apparatus. Such a color chart includes patches in colors reproducible by the image forming apparatus. The image forming apparatus forms an image of the color chart on a recording medium and outputs the recording medium bearing the color chart. The color chart on the recording medium thus output is measured by, e.g., a colorimeter. A color conversion profile is generated based on data of the color chart thus measured.

SUMMARY

In one embodiment of the present disclosure, a color chart includes a first portion and a second portion. The first portion includes no patch. The second portion includes a plurality of patches having different densities or luminances. The plurality of patches includes a reference patch indicating a color having a reference density or luminance. The reference patch is adjacent to the first portion. The plurality of patches is located in order of increasing density from the density of the color indicated by the reference patch, decreasing density from the density of the color indicated by the reference patch, increasing luminance from the luminance of the color indicated by the reference patch, or decreasing luminance from the luminance of the color indicated by the reference patch.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
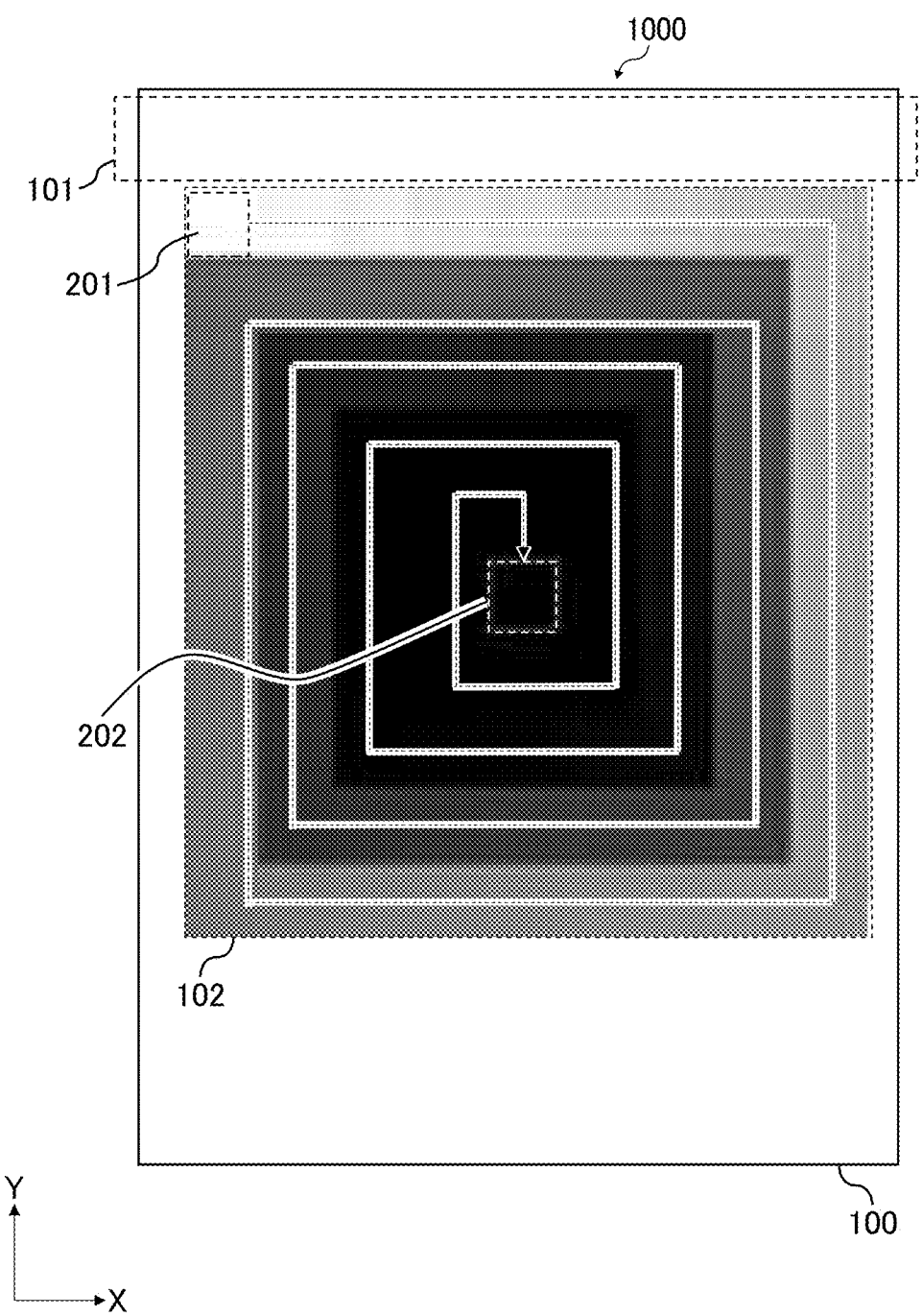
FIG. 1 is a diagram illustrating a color chart according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a," "an," and "the" are intended to include the plural forms as well, unless the context clearly indicates otherwise.

In a later-described comparative example, embodiment, and exemplary variation, for the sake of simplicity, like reference numerals are given to identical or corresponding constituent elements such as parts and materials having the same functions, and redundant descriptions thereof are omitted unless otherwise required.

It is to be noted that, in the following description, suffixes Y, M, C, and K (or Bk) denote colors of yellow, magenta, cyan, and black, respectively. To simplify the description, these suffixes are omitted unless necessary.

Referring to the drawings, wherein like reference numerals designate identical or corresponding parts throughout the several views, embodiments of the present disclosure are described below.

Initially, a description is given of a first embodiment of the present disclosure.

A color chart is used for, e.g., calibration for adjusting the color reproduction density of image formation performed by an image forming apparatus. Accordingly, the color chart may be referred to as a calibration chart. The color chart has a configuration as described below, for example.

FIG. 1 is a diagram illustrating an example of a color chart 1000.

For example, an image including a plurality of patches is formed on a sheet 100 serving as a recording medium. Thus, the color chart 1000 is created. Note that such an image including a plurality of patches may be referred to as a pattern image in the following description.

The patch is an image in preset color, density, and shape. The image serving as the patch is set according to calibration. In other words, the image serving as the patch is not limited to an image in specific color, density, and shape. Similarly, e.g., the combination, number, and size of the patches constructing the color chart 1000 are set in advance according to calibration.

In the present example illustrated in FIG. 1, the color chart 1000 includes a first portion 101 and a second portion 102. The first portion 101 indicates an area in which no pattern image is formed. By contrast, the second portion 102 indicates an area in which a pattern image is formed. In other words, the first portion 101 includes no patch; whereas the second portions 102 includes a plurality of patches.

In the present example, the sheet 100 is white. FIG. 1 illustrates boundaries with dotted lines. Alternatively, the boundaries may be indicated by no line.

As in the example illustrated in FIG. 1, the first portion 101 is, e.g., a so-called margin without a pattern image. The first portion 101 has a color of the sheet 100. In other words, the first portion 101 has a background color.

As in the example illustrated in FIG. 1, the second portion 102 is a portion in which patches are located such that the density increases in order from a reference patch 201 that is located at a portion adjacent to the first portion 101. In short, the reference patch 201 is adjacent to the first portion 101. The reference patch 201 is one of the outermost patches in the second portion 102.

In the present example, the reference patch 201 is the lowest density patch in the second portion 102. In the present example, the highest density patch in the second portion 102 is a last patch 202 located at a central portion of the second portion 102.

For example, the patches are located such that the density increases from the reference patch 201 toward the last patch 202 (in the order indicated by arrow in FIG. 1). In the present example, the density decreases outward and increases inward to the central portion of the second portion 102. In a case in which the sheet 100 is white as in the present example, the reference patch 201 is preferably white or in a color having a density close to the color of the sheet 100.

As indicated by arrow in FIG. 1, for example, the patches are located in a spiral shape toward the central portion of the second portion 102. Specifically, the patches are located in the order described below.

Figure 2:
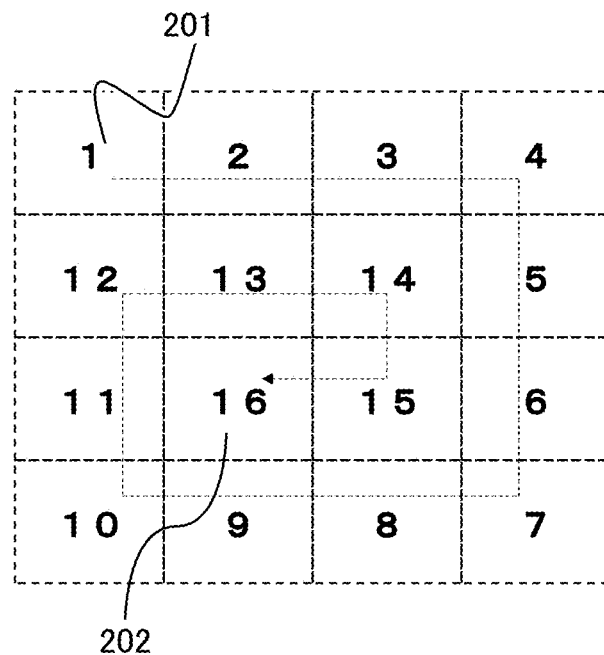
FIG. 2 is a diagram illustrating an example of location of patches according to an embodiment of the present disclosure.

FIG. 2 is a diagram illustrating an example of location of patches.

Now, a description is given of an example in which the color chart 1000 includes 16 patches. FIG. 2 illustrates the order in which the patches are located by numbers. FIG. 2 also illustrates the order of increasing density by a dotted arrow.

Specifically, the patches are located such that the density increases in order from the portion indicated by "1" to the portion indicated by "16." In short, the highest density patch (e.g., the last patch 202) is located at the portion indicated by "16"; whereas the lowest density patch (e.g., the reference patch 201) is located at the portion indicated by "1." In the color chart 1000 of the present example, the density of the patches increases as the number increases, from the lightest patch located at the portion indicated by "1" to the darkest patch located at the portion indicated by "16."

The number of patches is not limited to 16. The number of patches may be increased to finely change the density of the patches. By contrast, the number of patches may be less than 16.

As described above, preferably, patches in a color having a density close to the color of the sheet 100 are located at portions adjacent to the first portion 101, such as the portions indicated by "1" to "4." In addition, preferably, the patches are located such that the density increases toward an inner portion such as a portion indicated by "15" or "16."

Such a location of the patches reduces the difference in gradation between adjacent patches such as patches "1" and "2" (i.e., the patches located at the portions indicated by "1" and "2").

Alternatively, the patches may be located as described below, for example.

Figure 3:
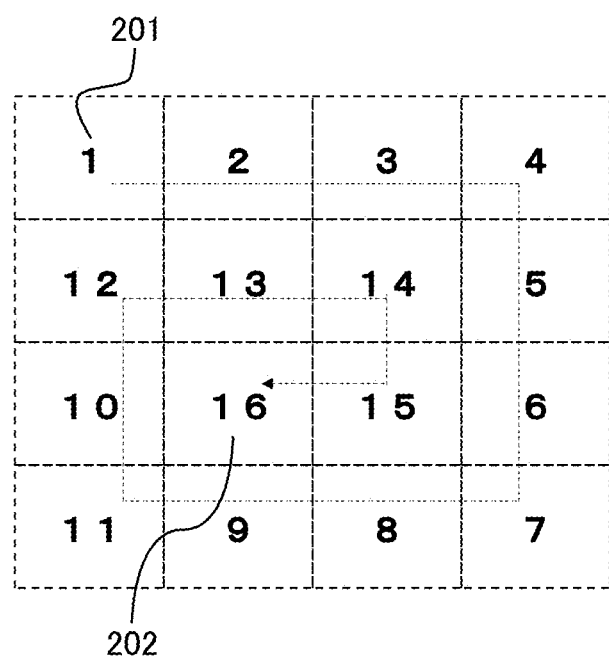
FIG. 3 is a diagram illustrating a modification of the location of patches of FIG. 2.

FIG. 3 is a diagram illustrating a modification of the location of the patches of FIG. 2.

The location illustrated in FIG. 3 is different from the location illustrated in FIG. 2 in that the order of patches "10" and "11" (i.e., the patches located at the portions indicated by "10" and "11") are reversed. In other words, the patches may not be located in order of completely increasing density.

Specifically, provided that the difference in gradation between adjacent patches is relatively small, such as a combination of patches "10" and "11", a combination of patches "10" and "12" (i.e., the patches located at the portions indicated by "10" and "12"), and a combination of patches "11" and "9" (i.e., the patches located at the portions indicated by "11" and "9"), the patches may not be located in the order of completely increasing density.

Whether the difference in gradation is relatively small is determined by, e.g., whether the difference in gradation is equal to or greater than a preset value. In short, the color chart 1000 includes patches located such that patches having a relatively small difference in gradation less than the preset value are adjacent to each other.

The color chart 1000 including the patched located as described above reduces the difference in gradation between the color of the sheet 100 and the color of outer circumferential patches of the second portion 102 such as the reference patch 201. In short, such a color chart reduces the influence of flare in calibration. Reducing the influence of flare enhances the color reproducibility and the image quality in image formation. With the configuration described above, the number of patches is not to be reduced.

When a reading device reads a color chart in calibration, the reading device may capture reflected light entering from the periphery of target patches, thus causing the flare. As the difference in gradation between the color of patches and the color of the sheet 100 is larger, the detected data is more likely to deviate from the true value due to the influence of the flare. To prevent such a situation, preferably, the reference patch 201 as a patch located at a portion adjacent to the portion in the color of the sheet 100 has the same density as the color of the sheet 100 or a density close to the color of the sheet 100. When the patches are located such that the density increases in order starting from the reference patch 201, a patch having a relatively low density in the entire color chart 1000 may be located at a portion in the color of the sheet 100 or having a density close to the color of the sheet 100. In short, the difference in the density between e.g., the reference patch 201 and the color of the recording medium is preferably equal to or less than a given value.

A description is now given of a second embodiment of the present disclosure.

The second embodiment is different from the first embodiment in that the color of the sheet 100 is black, for example. In other words, in the second embodiment, the color of the first portion 101 in which no pattern image exists is black.

The reference patch 201 is preferably changed according to the color of the recording medium. Specifically, when the color of the sheet 100 is black as in the second embodiment, the reference patch 201 is preferably changed as follows.

Figure 4:
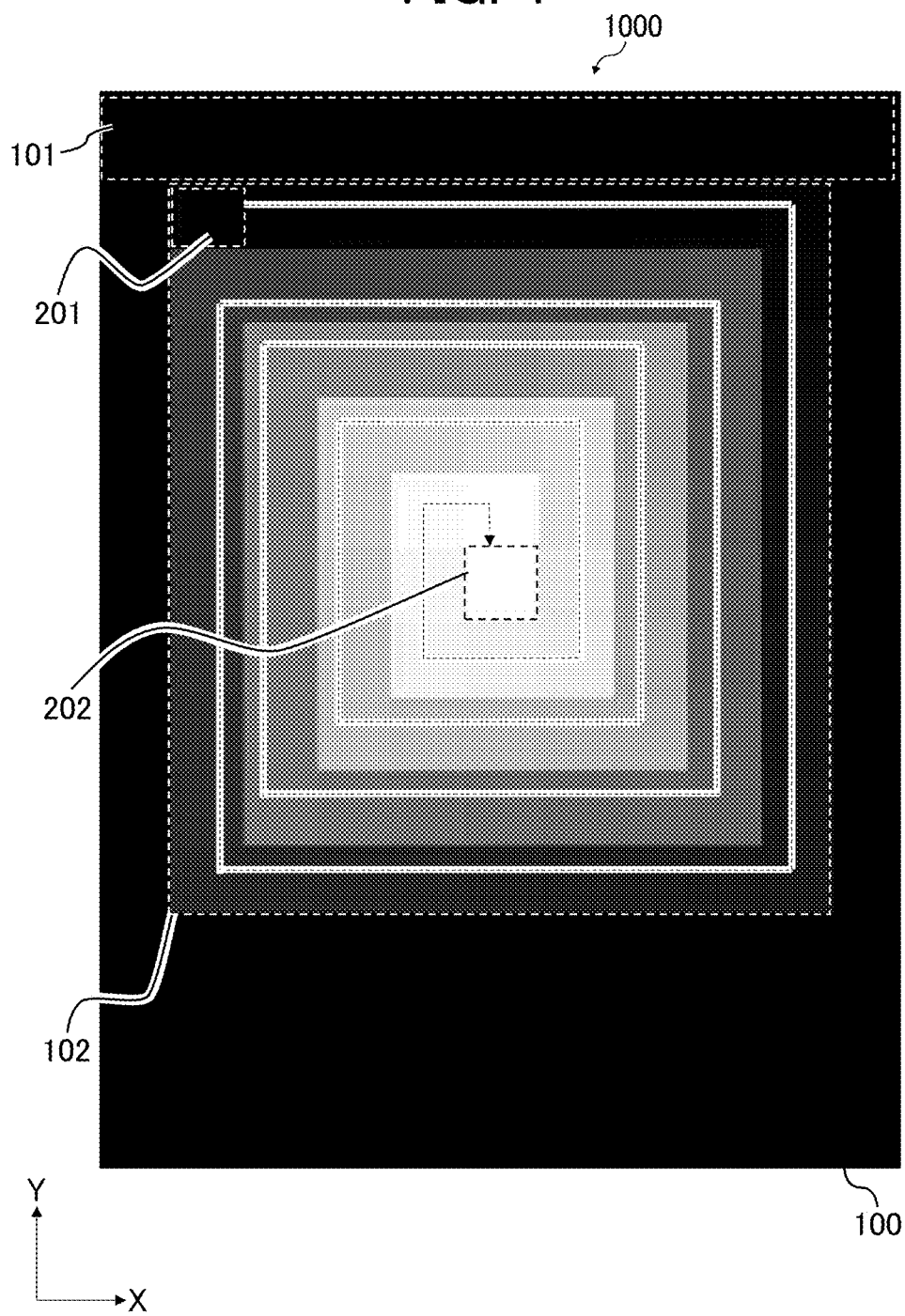
FIG. 4 is a diagram illustrating a color chart on a black recording medium according to an embodiment of the present disclosure.

FIG. 4 is a diagram illustrating an example of the color chart 1000 on a black recording medium.

In the present example, the patches are located such that the density of the patches increases outward and decreases inward. In a case in which the sheet 100 is black as in the present example, the reference patch 201 is preferably black or in a color having a density close to the color of the sheet 100. As described above, preferably, the reference patch 201 is changed according to the color of the sheet 100, to a color having the same density as the color of the sheet 100 or a color having a density close to the color of the sheet 100. The patches are located such that the density decreases in order from the reference patch 201 toward the last patch 202.

Although the color of the sheet 100 is white in the first embodiment, the color of the sheet 100 is not limited to white. As in the second embodiment, the color of the sheet 100 may be black. Alternatively, the color of the sheet 100 may be an intermediate color. The intermediate color is, e.g., red.

In a case in which the sheet 100 is in an intermediate color, the color chart 1000 may include a plurality of second portions 102, for example. Now, a description is given of an example in which the color chart 1000 includes two second portions (each corresponding to the second portion 102).

Figure 5:
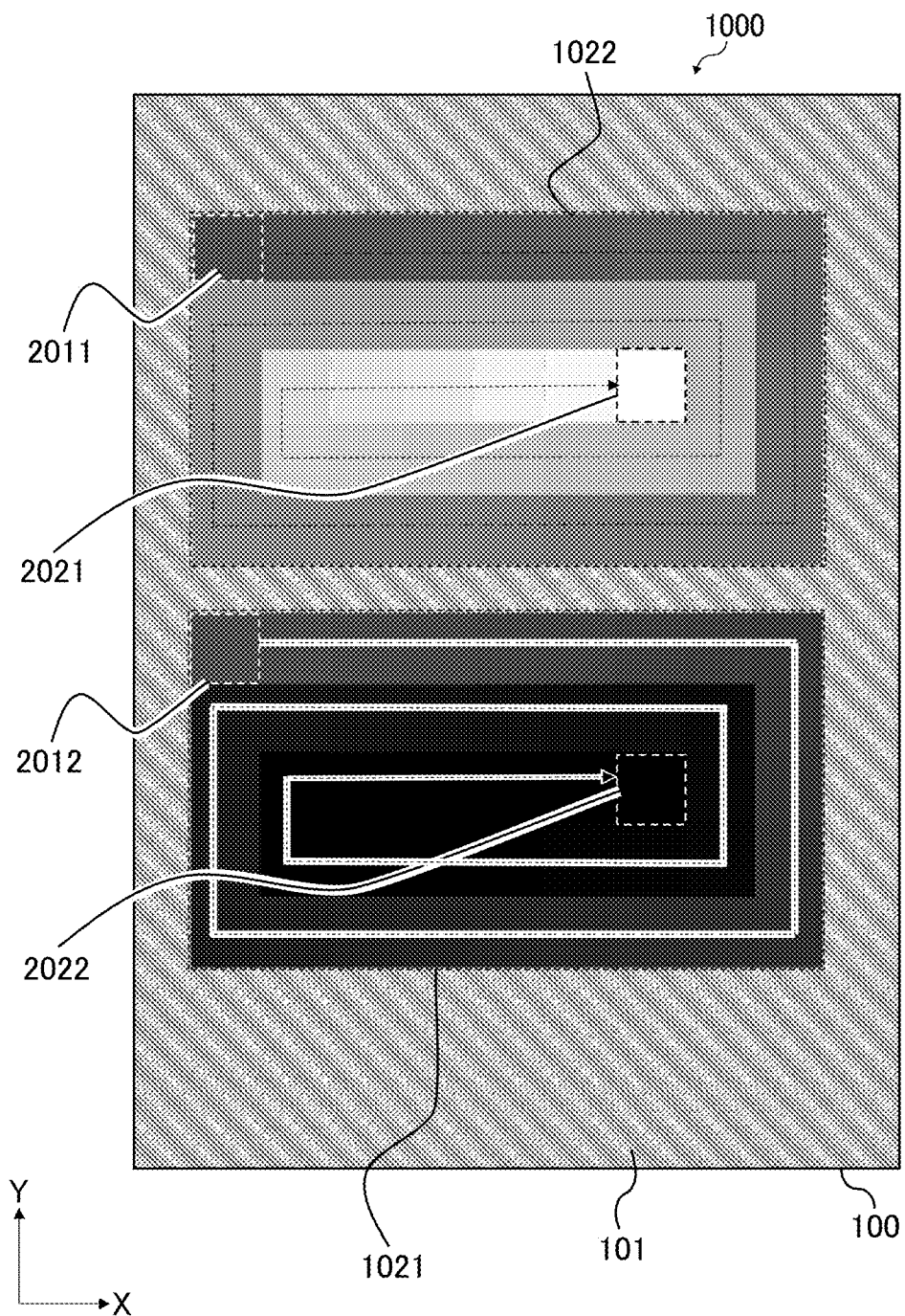
FIG. 5 is a diagram illustrating a color chart including a plurality of portions in which pattern images are formed, according to an embodiment of the present disclosure.

FIG. 5 is a diagram illustrating an example of the color chart 1000 including two second portions (each corresponding to the second portion 102).

In the present example, the color of the sheet 100 is red. In FIG. 5, the hatched portion is the first portion 101 as a portion in a background color.

For example, the two second portions are vertically located, one by one, in the Y direction in FIG. 5. In the present example, the two second portions are referred to as an upper portion 1022 and a lower portion 1021. The upper portion 1022 is a second portion disposed above; whereas the lower portion 1021 is a second portion disposed below.

The upper portion 1022 includes patches located in a spiral shape such that the density decreases inward in order from a first reference patch 2011, which is located at the upper left in the upper portion 1022, to a first last patch 2021, which is the lightest patch located at the center of the upper portion 1022. On the other hand, the lower portion 1021 includes patches located in a spiral shape such that the density increases inward in order from a second reference patch 2012, which is located at the upper left in the lower portion 1021, to a second last patch 2022, which is the darkest patch located at the center of the lower portion 1021.

FIG. 5 illustrates the first reference patch 2011, the second reference patch 2012, and the first portion 101 in different colors for the sake of description. Preferably, the first reference patch 2011, the second reference patch 2012, and the first portion 101 are in a color having densities close to each other.

As in the present example, the color chart 1000 may include two second portions: a second portion in which patches are located such that the density decreases from the first reference patch 2011 to the first last patch 2021 as in the upper portion 1022, and a second portion in which patches are located such that the density increases from the second reference patch 2012 to the second last patch 2022 as in the lower portion 1021.

In particular, in a case in which an intermediate color is used, both the location of patches in which the density sequentially increases and the location of patches in which the density sequentially decreases may be used for calibration. In a case in which the recording medium is in an intermediate color, the density of the reference patch is an intermediate value. In other words, either the location of patches in which the density increases or the location of patches in which the density decreases may be insufficient to acquire all the densities, resulting in generation of insufficient calibration data. By contrast, as in the above-described example in which the color chart 1000 includes a plurality of second portions, the color reproduction is enhanced by calibration with calibration data acquired, even in a case in which the recording medium is in an intermediate color.

The example described above is an example in which the two second portions (i.e., the upper portion 1022 and the lower portion 1021) are equal to each other. Alternatively, the upper portion 1022 and the lower portion 1021 may not be equal to each other. Specifically, the ratio in number between the patches located in the upper portion 1022 and the patches located in the lower portion 1021 in the example described above is preferably adjusted depending on the intermediate color. For example, in a case in which the sheet 100 is in an intermediate and dark color, the patches located in the lower portion 1021 is less in number or ratio than the patches located in the upper portion 1022. Thus, e.g., the number of patches in the plurality of second portions is preferably adjusted according to the density of the intermediate color.

Now, a detailed description is given of the reference patch 201.

The reference patch 201 is located as described below.

Figure 6:
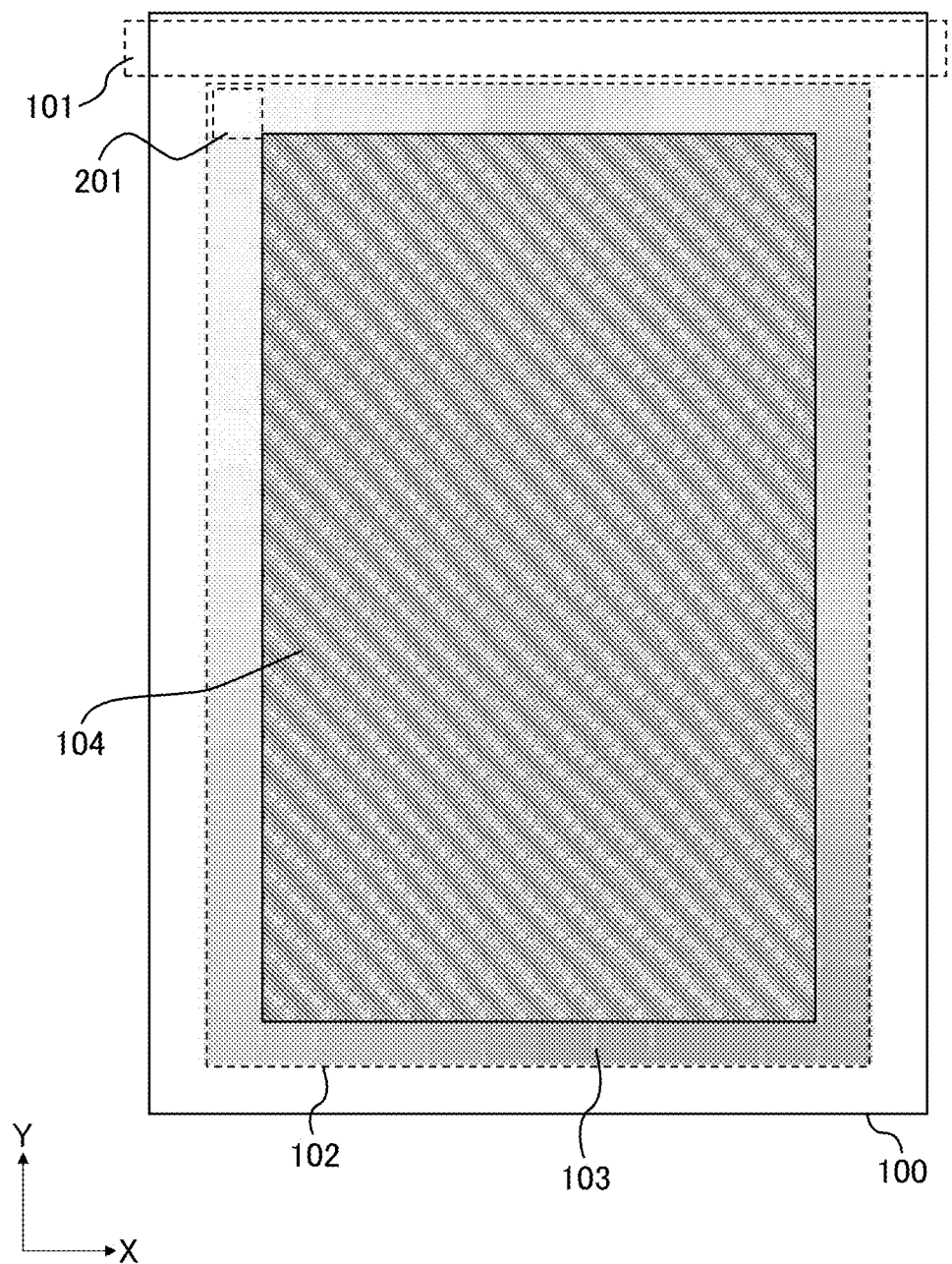
FIG. 6 is a diagram illustrating an example of location of a reference patch according to an embodiment of the present disclosure.

FIG. 6 is a diagram illustrating an example of location of the reference patch 201.

In the present example, the sheet 100 is white. For example, the reference patch 201 is located anywhere in an outer circumferential portion (e.g., an outermost circumferential portion 103 in FIG. 6) of the second portion 102. As illustrated in FIG. 6, the outermost circumferential portion 103 may be a pattern image. On the other hand, patches may be or may not be located in an inner portion 104, which is a portion inside the outermost circumferential portion 103 and illustrated as a hatched portion in FIG. 6. In other words, the inner portion 104 may be blank without a pattern image or may include any image. For the sake of description, the inner portion 104 is hatched in FIG. 6. However, the inner portion 104 is not hatched in actuality.

As described above, locating the reference patch 201 in the outermost circumferential portion 103 reduces the difference in gradation between the color of the patches and the color of the sheet 100. Specifically, such a location attains a difference in gradation of about 30% or less. Accordingly, the influence of flare is reduced.

As in the second embodiment, the color of the sheet 100 may be, e.g., black or an intermediate color as described below.

Figure 7:
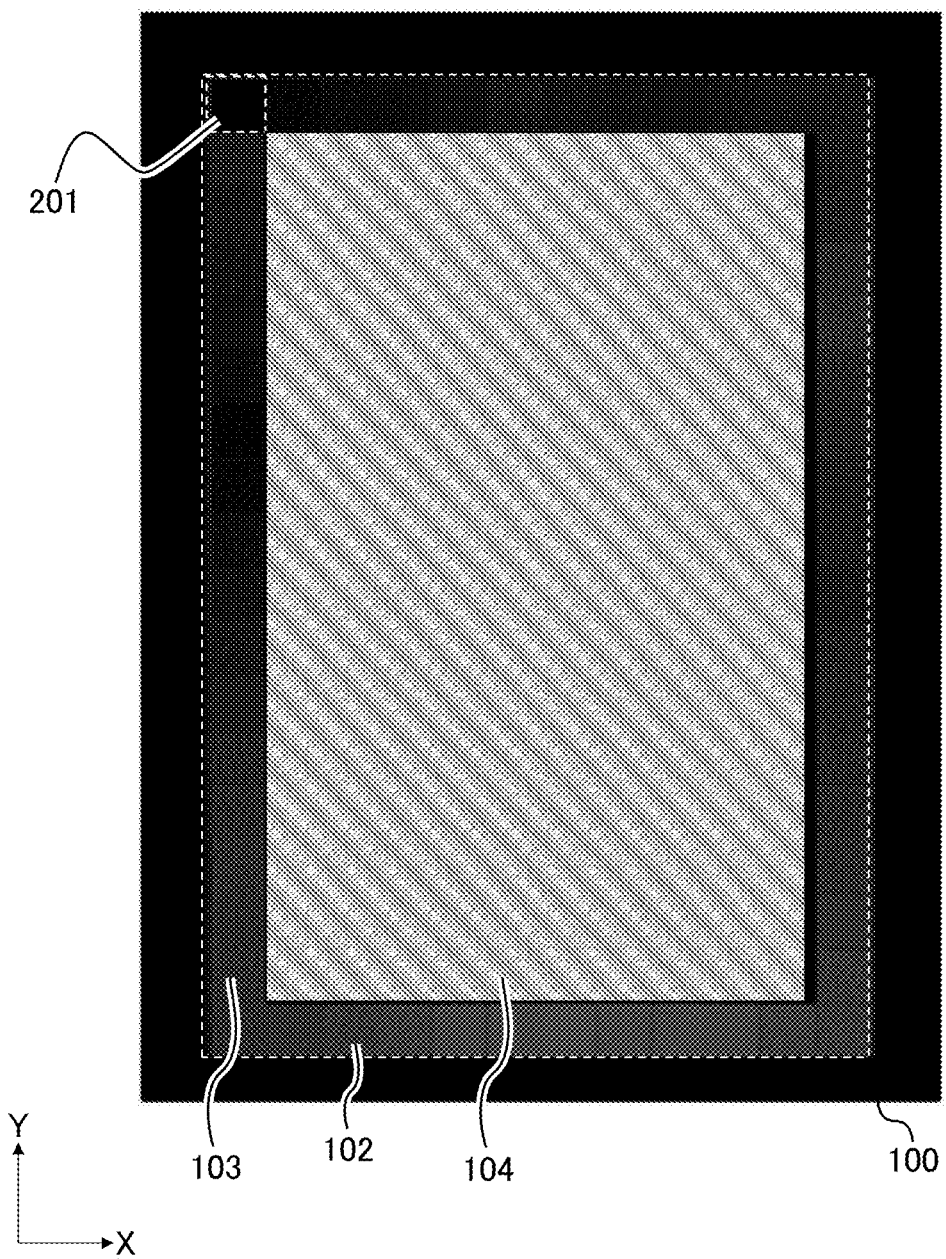
FIG. 7 is a diagram illustrating an example of location of the reference patch of FIG. 6 on a black recording medium.

FIG. 7 is a diagram illustrating an example of location of the reference patch 201 on a black recording medium.

In a case in which the sheet 100 is black as illustrated in FIG. 7, the reference patch 201 is set to a color close to black. As described above with reference to FIG. 6, patches may be or may not be located in the inner portion 104.

Figure 8:
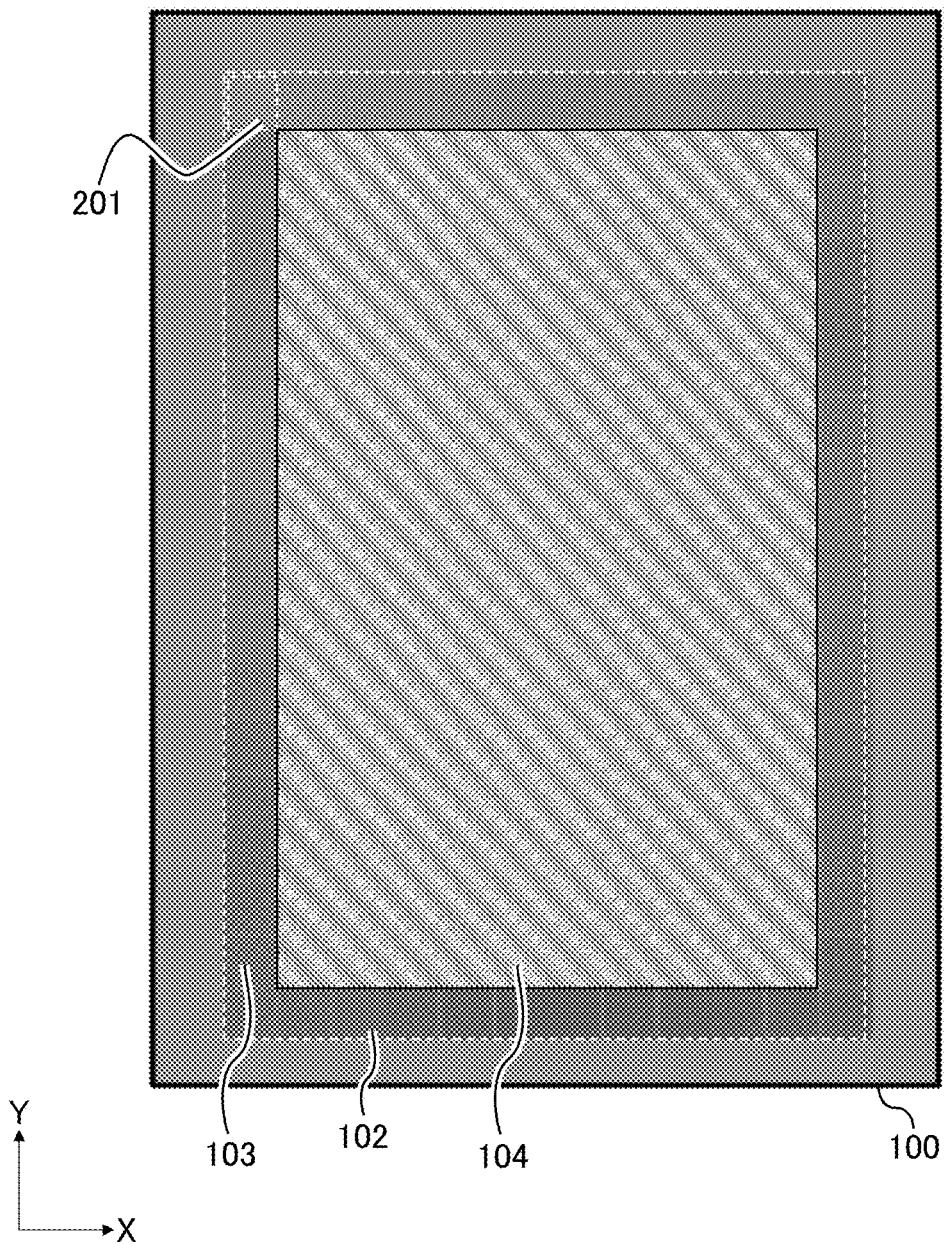
FIG. 8 is a diagram illustrating an example of location of the reference patch of FIG. 6 on a recording medium in an intermediate color.

FIG. 8 is a diagram illustrating an example of location of the reference patch 201 on a recording medium in an intermediate color.

In a case in which the sheet 100 is an intermediate color such as red as illustrated in FIG. 8, the color of the reference patch 201 is set to a color having a density, which is luminance in a modification described later, close to the color of the background. As described above with reference to FIG. 6, patches may be or may not be located in the inner portion 104.

Now, a description is given of an example of location of patches.

For example, the patches are located in gradation described below.

Figure 9:
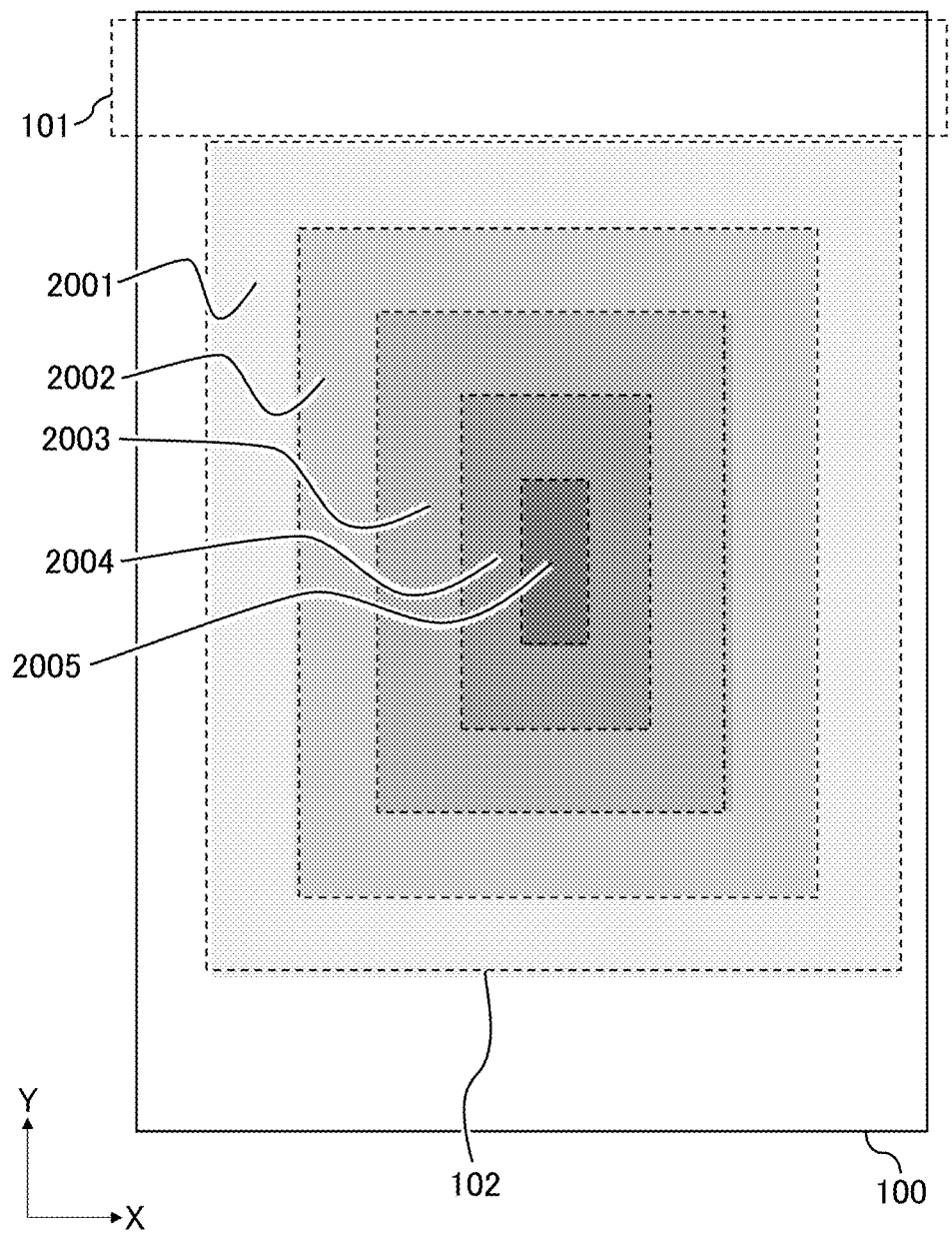
FIG. 9 is a diagram illustrating a gradation range according to an embodiment of the present disclosure.

FIG. 9 is a diagram illustrating a gradation range.

As illustrated in FIG. 9, in the present example, the second portion 102 is segmented into 5 areas inward: a first area 2001, a second area 2002, a third area 2003, a fourth area 2004, and a fifth area 2005.

The gradation has 100 tones from 0 to 99 in the present example. For each of the first to fifth areas 2001 to 2005, the gradation range, which is a range of tones of patches, is set in advance. In the present example, a higher tone indicates a lighter color close to white. For example, the gradation range is set as presented in Table 1 for each of the first to fifth areas 2001 to 2005.

TABLE 1

| AREA | GRADATION RANGE CLASS | GRADATION RANGE |
| --- | --- | --- |
| FIRST AREA | A | 71 TO 99 |
| SECOND AREA | B | 51 TO 70 |
| THIRD AREA |  | 31 TO 50 |
| FOURTH AREA | C | 11 TO 30 |
| FIFTH AREA |  | 0 TO 10 |

As presented in Table 1 above, patches in tones from 71 to 99 are located in the first area 2001, which is adjacent to the first portion 101. Also as presented in Table 1 above, patches in tones smaller than tones of the patches located in the first area 2001 and greater than tones of patches located in the third area 2003 are located in the second area 2002.

Similarly, the patches in tones smaller than the tones of the patches located in the second area 2002 and greater than tones of patches located in the fourth area 2004 are located in the third area 2003. The patches in tones smaller than the tones of the patches located in the third area 2003 and greater than tones of patches located in the fifth area 2005 are located in the fourth area 2004. Lastly, the patches in tones smaller than the tones of the patches located in the fourth area 2004 are located in the fifth area 2005. As described above, the patches are preferably located such that the density increases (in other words, the tones indicated in the column of "gradation range" in Table 1 decreases) inward in the first to fifth areas 2001 to 2005.

More preferably, such a location reduces a difference in gradation between the patches and the background and a difference in gradation between adjacent patches.

The location of the patches is not limited to the example presented in Table 1, provided that the difference in gradation between the patches and the background and the difference in gradation between the adjacent patches are within a certain range. For example, the following combination of "gradation range" and "area" may be used.

Figure 10:
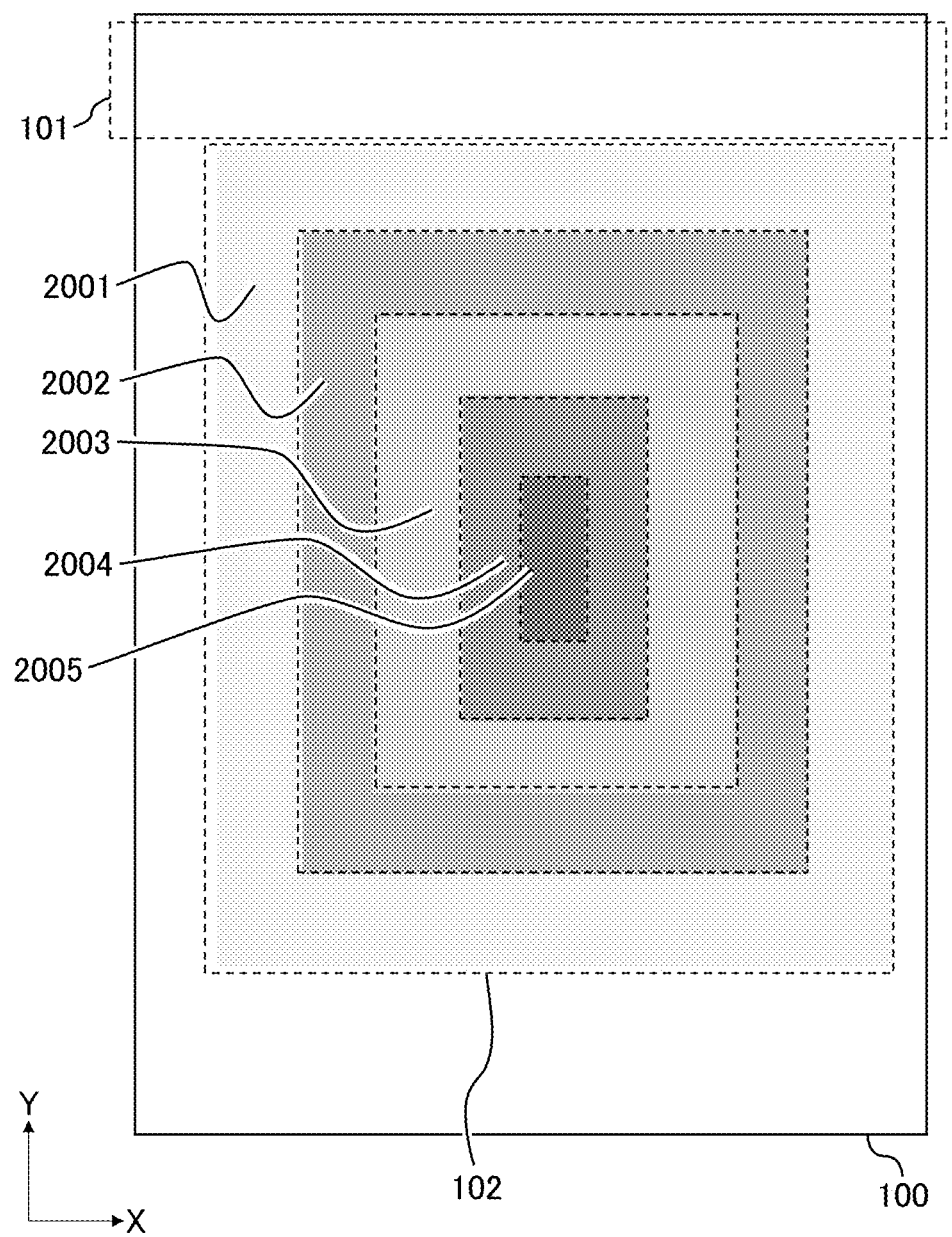
FIG. 10 is a diagram illustrating a modification of the gradation range of FIG. 9.

FIG. 10 is a diagram illustrating a modification of the gradation range described above.

In the present example, as presented in Table 1 above, the gradation range of from 71 to 99 is classified into a gradation range class "A." The two gradation ranges of from 51 to 70 and from 31 to 50 are collectively classified into a gradation range class "B." Further, the two gradation ranges of from 11 to 30 and from 0 to 10 are collectively classified into a gradation range class "C."

The present example illustrated in FIG. 10 is different from the example illustrated in FIG. 9 in the gradation ranges for the areas in the gradation range class "B." Specifically, the gradation range for the second area in FIG. 9 is for the third area in FIG. 10. Similarly, the gradation range for the third area in FIG. 9 is for the second area in FIG. 10. In other words, as illustrated in FIG. 10, the second area 2002 having a higher density than the density of the third area 2003 is located outside the third area 2003. Specifically, the patches are located as presented in Table 2 below.

TABLE 2

| AREA | GRADATION RANGE CLASS | GRADATION RANGE |
| --- | --- | --- |
| FIRST AREA | A | 71 TO 99 |
| SECOND AREA | B | 31 TO 50 |
| THIRD AREA |  | 51 TO 70 |
| FOURTH AREA | C | 11 TO 30 |
| FIFTH AREA |  | 0 TO 10 |

Table 2 above is different from Table 1 above in that the gradation range for the second area (presented in the second row from the top in Table 2) and the gradation range for the third area (presented in the third row from the top in the Table 2) are replaced with each other. As described above, the gradation ranges may be replaced with each other in the same gradation range class.

The gradation range class is not limited to the setting as presented in Table 2. For example, three or more areas may belong to one gradation range class.

Setting the gradation range and setting the areas are not limited to the examples described above with reference to Table 1. For example, the second portion 102 may be segmented into 6 or more areas. Alternatively, the second portion 102 may be segmented into less than five areas. Optionally, the "gradation area class" may not be set. In a case in which the "gradation area class" is set, the gradation ranges in different gradation range classes may be replaced with each other.

Now, a description is given of a modification.

The location of patches is not limited to the location according to the CMYK-based density, which is a value determined on a cyan, magenta, yellow, and black (CMYK) basis. For example, the order of the reference patch 201 and other patches may be determined according to a color space of L*a*b*, which may be referred to as Lab in the following description. In other words, the order of the reference patch 201 and other patches may be determined according to the Lab-based luminance, which is a value determined on an L*a*b* (Lab) basis.

The "Lab" is a color space defined by the Commission internationale de l'eclairage (CIE) standard.

The order of the reference patch 201 and other patches may be determined according to the luminance in the Lab color space.

The shape of patches (including the reference patch 201 and may be referred to collectively as a patch in the following description) is not limited to square. For example, the patch may be shaped as described below.

Figure 11:
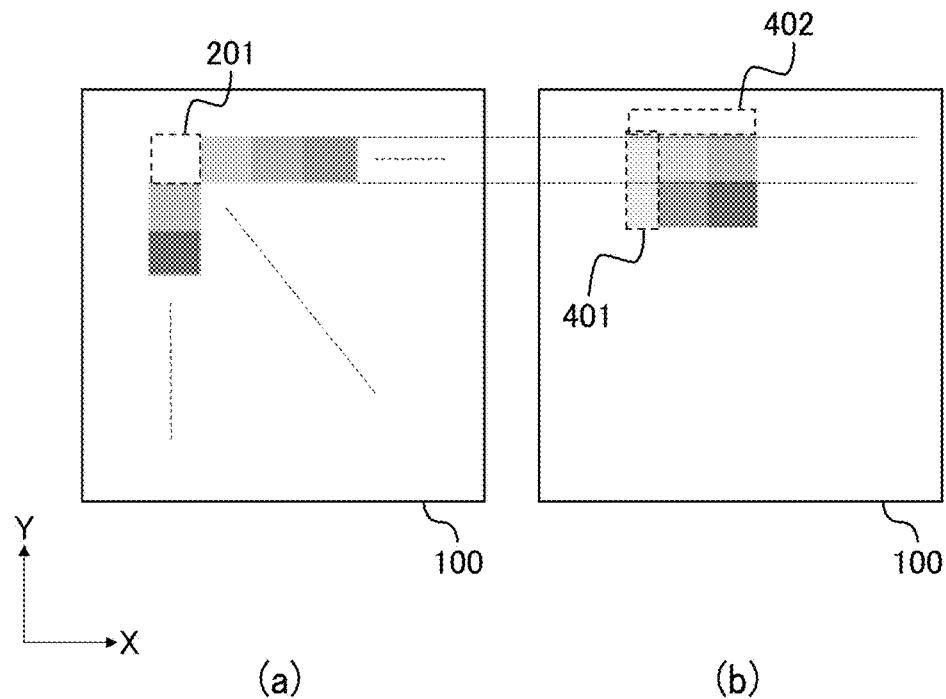
FIG. 11 is a diagram illustrating a modification of a patch according to an embodiment of the present disclosure.

FIG. 11 is a diagram illustrating a modification of the patch.

For comparison, part (a) of FIG. 11 illustrates an example in which all patches have a square shape.

By contrast, part (b) of FIG. 11 illustrates an example including a patch having a rectangular shape. Specifically, the patches may include, e.g., a vertically long patch 401 (i.e., a patch elongated in the Y-axis direction in FIG. 11) or a laterally long patch 402 (i.e., a patch elongated in the X-axis direction in FIG. 11).

The patch that is used for calibration may have any shape provided that the patch has a certain area. In other words, the shape of the patch is not limited to square and may be other shapes such as rectangle. The patches may have a common shape or different shapes. Preferably, however, the patches have identical areas as much as possible.

In a case in which one or more patches are shaped as, e.g., rectangle, the patches are more freely located. For example, locating an elongated patch reduces the number of patches located at the outer circumferential positions of the second portion 102. In short, the reference patch 201 and other patches preferably have identical areas and have different shapes.

Now, a description is given of an image forming apparatus according to an embodiment of the present disclosure.

The image forming apparatus has a hardware configuration described below, for example.

Figure 12:
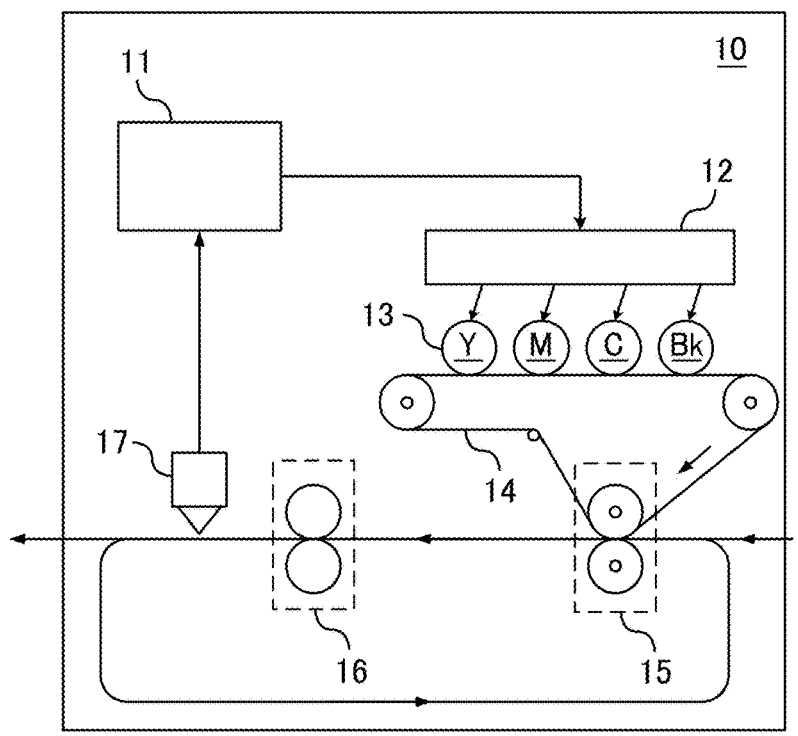
FIG. 12 is a block diagram illustrating a hardware configuration of an image forming apparatus according to an embodiment of the present disclosure.

FIG. 12 is a block diagram illustrating a hardware configuration of an image forming apparatus 10.

For example, the image forming apparatus 10 includes a control device 11, a writing device 12, an image forming device 13, an intermediate transfer belt 14, a secondary transfer device 15, a fixing device 16, and a reading device 17.

The control device 11 is, e.g., an arithmetic device provided with a storage device. The control device 11 controls, e.g., the writing device 12 to control image formation.

The writing device 12, the image forming device 13, the intermediate transfer belt 14, the secondary transfer device 15, and the fixing device 16 perform the image formation according to, e.g., input image data. Specifically, in a case in which an image represented by image data is formed on the sheet 100, a latent image generated according to the image data is developed into a visible toner image, which is transferred onto the intermediate transfer belt 14. The secondary transfer device 15 transfers the toner image from the intermediate transfer belt 14 onto the sheet 100. The fixing device 16 heats the sheet 100 bearing the toner image to fix the toner image onto the sheet 100. In the case of duplex printing on the sheet 100, such a series of image forming operations is performed on both sides of the sheet 100.

The reading device 17 is, e.g., an optical sensor. Specifically, the reading device 17 reads, e.g., a pattern image for calibration formed on the sheet 100 and generates, e.g., image data. Calibration is performed based on, e.g., the image data thus generated.

Alternatively, the image forming apparatus 10 may have a configuration as described below, for example.

Figure 13:
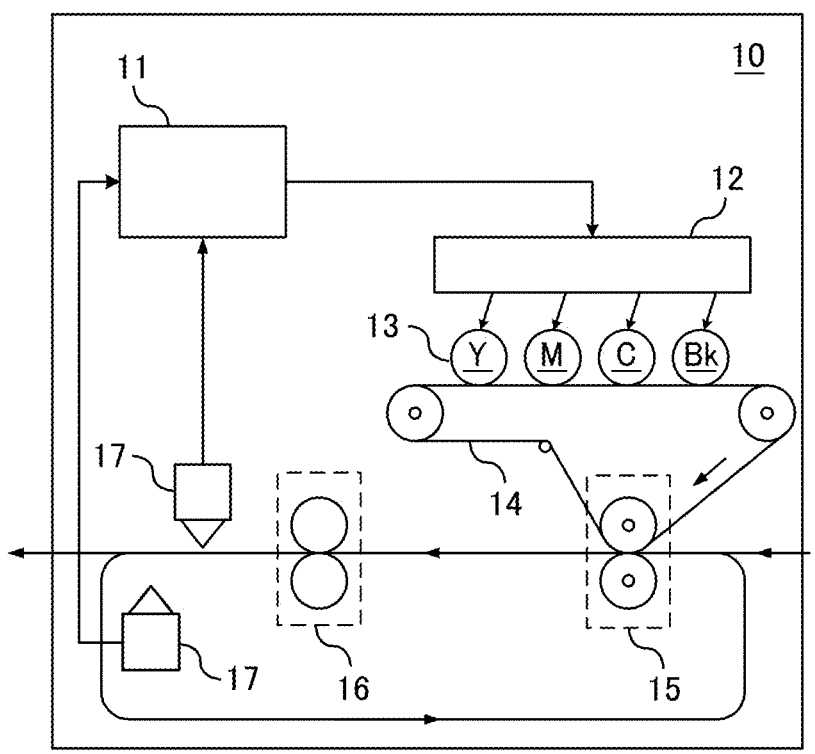
FIG. 13 is a block diagram illustrating a first modification of the hardware configuration of the image forming apparatus of FIG. 12.

FIG. 13 is a block diagram illustrating a first modification of the hardware configuration of the image forming apparatus 10 described above.

The hardware configuration illustrated in FIG. 13 is different from the hardware configuration illustrated in FIG. 12 in that two reading devices 17 are disposed. Alternatively, three or more reading devices 17 may be disposed.

In other words, the reading devices 17 may be constructed of the reading device 17 that reads a front side of the sheet 100 and the reading device 17 that reads a back side of the sheet 100.

Alternatively, the image forming apparatus 10 may have a configuration as described below, for example.

Figure 14:
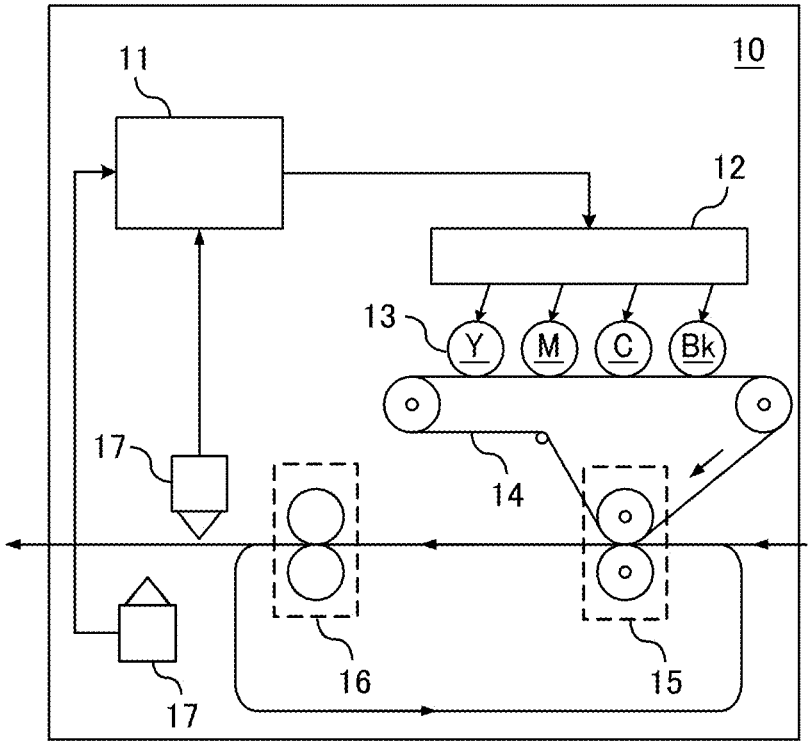
FIG. 14 is a block diagram illustrating a second modification of the hardware configuration of the image forming apparatus of FIG. 12.

FIG. 14 is a block diagram illustrating a second modification of the hardware configuration of the image forming apparatus 10 described above.

The reading devices 17 may be located as illustrated in FIG. 14.

In particular, in printing such as production printing, high image quality is often required. In order to satisfy such a requirement, a user performs calibration depending on a change over time, an environmental change, usage conditions, or a combination thereof, thus enhancing the image quality of image formation. In such a case, performing calibration on an image forming apparatus with the color chart 1000 according to the present embodiment adjusts the characteristics of the image forming apparatus.

In calibration, a gradation characteristic (e.g., a characteristic indicated by a γ correction curve) is adjusted based on data of the color chart 1000 optically read.

One or more embodiments of the present disclosure may be applied to an image forming system that includes an apparatus or device in addition to the image forming apparatus 10. For example, the image forming apparatus 10 and the reading device 17 may be separated from each other as described below.

Figure 15:
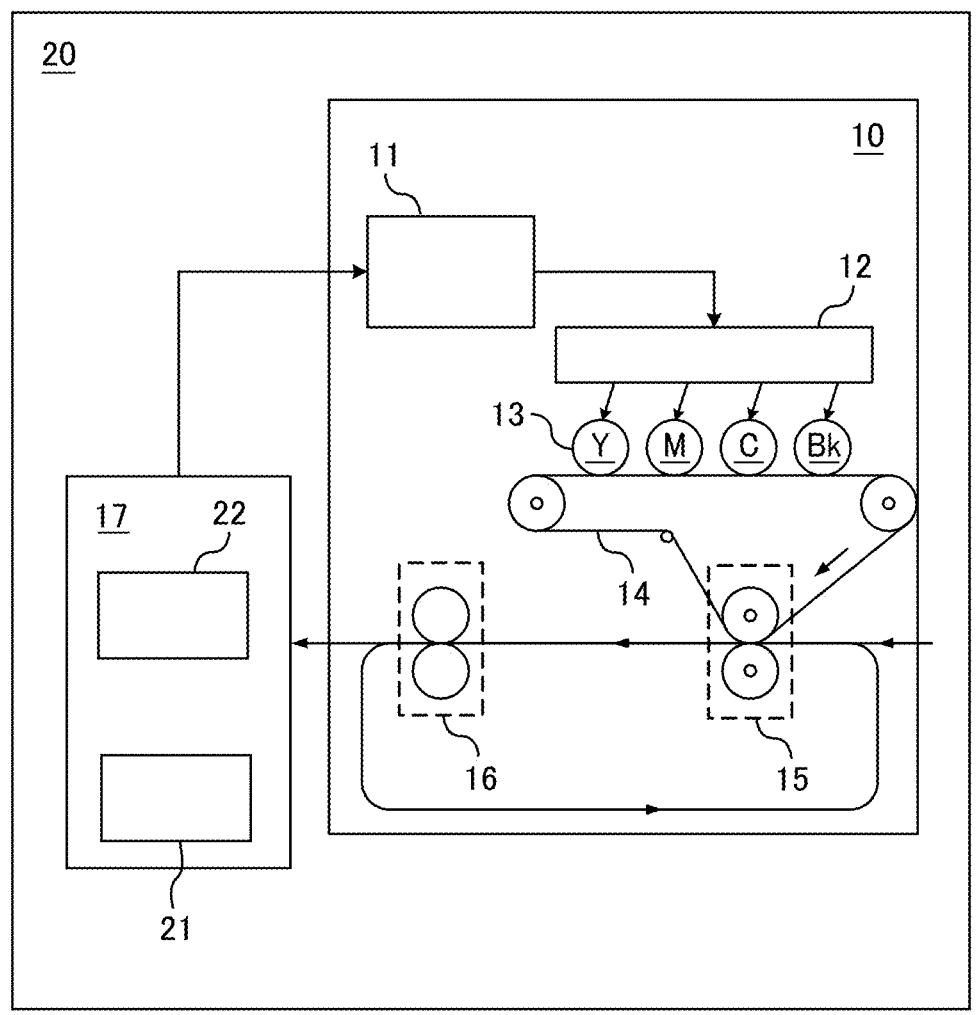
FIG. 15 is a diagram illustrating a configuration of an image forming system according to an embodiment of the present disclosure.

FIG. 15 is a diagram illustrating a configuration of an image forming system 20.

For example, the image forming system 20 is a system that includes a combination of the image forming apparatus 10 and the reading device 17, which is an external device independent of and separate from the image forming apparatus 10.

The image forming apparatus 10 illustrated in FIG. 15 is different from the image forming apparatuses 10 illustrated in FIGS. 13 and 14 in that the image forming apparatus 10 illustrated in FIG. 15 does not include the reading device 17. In the present example, the reading device 17 is, e.g., a so-called colorimeter. The reading devices 17 includes, e.g., a sensor 21 and a sensor control device 22. The sensor 21 serves as a reading unit that reads the color chart 1000. The sensor control device 22 serves as an output unit that outputs data of the color chart 1000 read by the sensor 21 to the image forming apparatus 10 that forms an image on a recording medium.

In the image forming system 20, first, the image forming apparatus 10 forms a test chart on the sheet 100. Thereafter, the reading device 17 reads the test chart. Specifically, the sheet 100 ejected from the image forming apparatus 10 is manually inserted into the reading device 17, for example. Then, the reading device 17 reads the test chart on the sheet 100 and inputs the read data to the image forming apparatus 10. The calibration may be performed with a plurality of devices, as in the present example in which an external device reads the test chart. In other words, the number and types of apparatuses or devices are not limited provided that the calibration is performed in a configuration as described below, for example.

Figure 16:
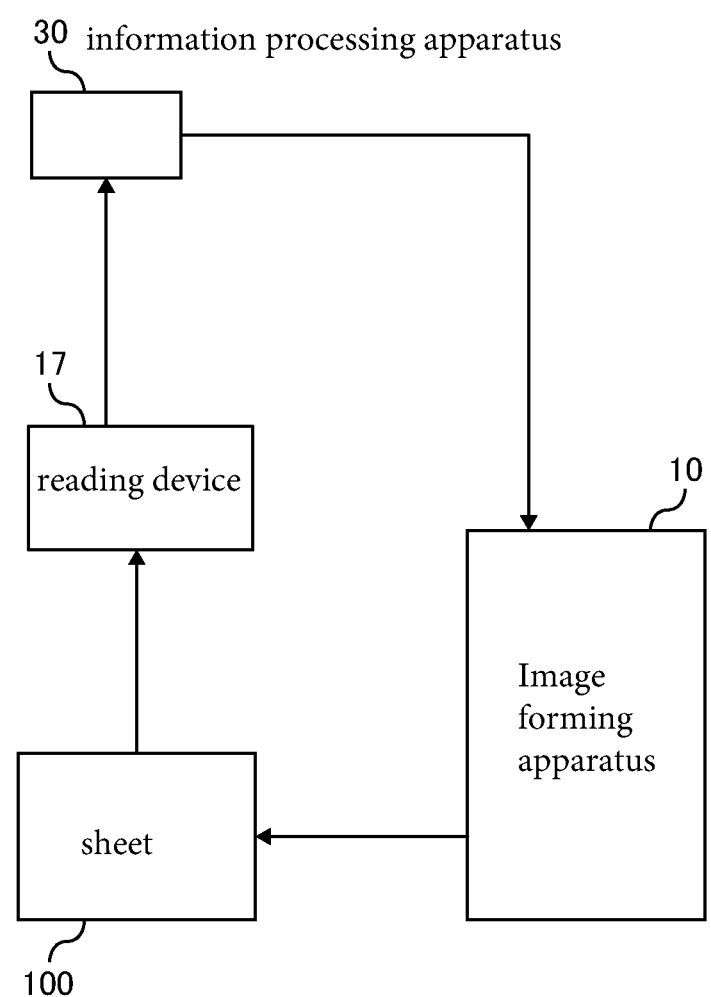
FIG. 16 is a diagram illustrating a configuration of an image forming system for performing calibration according to an embodiment of the present disclosure.

FIG. 16 is a diagram illustrating a configuration of an image forming system 20 for performing calibration.

For example, as illustrated in FIG. 16, first, the image forming apparatus 10 forms an image of, e.g., the color chart 1000 on the sheet 100 for calibration. Then, the reading device 17 such as a colorimeter reads the color chart 1000. With the read data output from the reading device 17, an information processing apparatus 30 such as a personal computer (PC) calculates a characteristic value. The calibration may be performed with the settings of the image forming apparatus 10 updated to conform to the characteristic value thus obtained.

According to one or more embodiments of the present disclosure, the image forming apparatus may be an image forming apparatus other than an electrophotographic image forming apparatus. For example, the image forming apparatus may be an inkjet image forming apparatus. The image forming apparatus may have a hardware configuration including hardware components other than the hardware components described above.

Now, a description is given of an overall process.

The calibration is performed in a procedure described below, for example.

Figure 17:
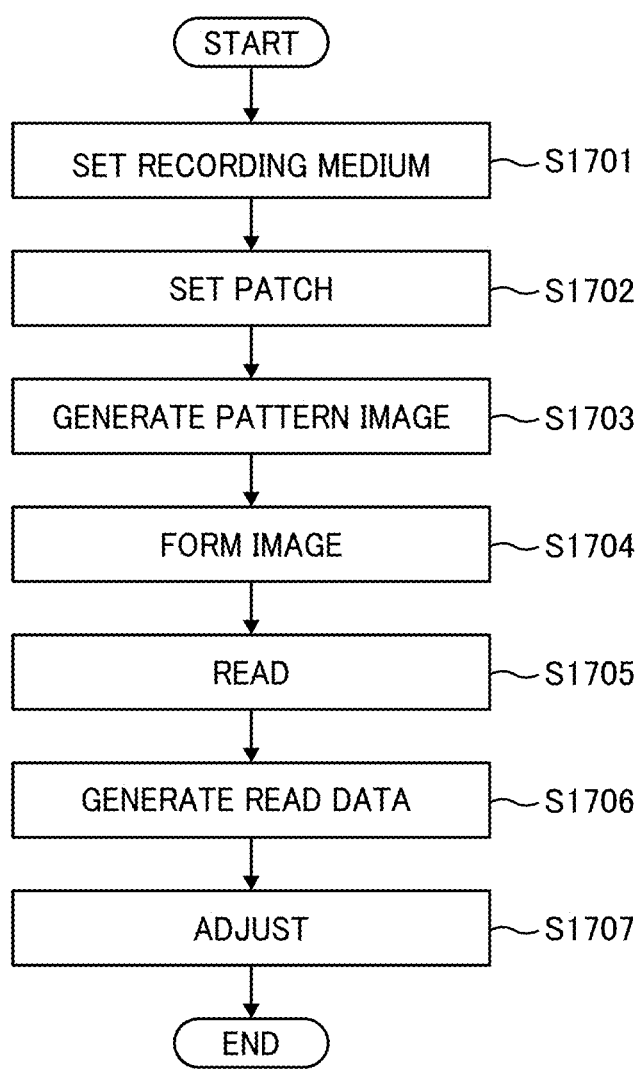
FIG. 17 is a flowchart of an overall process according to an embodiment of the present disclosure.

FIG. 17 is a flowchart of an overall process.

In the present example, the overall process is performed by the image forming apparatus 10 described above with reference to FIG. 12. In other words, the following will describe an example in which the image forming apparatus 10 including the reading device 17 together with the other devices performs the overall process.

In step S1701, the image forming apparatus 10 sets a recording medium. Specifically, a user inputs information of the sheet 100 that is used for calibration, to the image forming apparatus 10.

In step S1702, the image forming apparatus 10 sets a patch. For example, the image forming apparatus 10 determines, e.g., the color of the reference patch 201, the location of patches, and the number of patches, according to the color of the recording medium. Thus, the configuration of the color chart 1000 is determined. Note that the image forming apparatus 10 may set, e.g., the location of the reference patch 201 to identify data based on the reference patch 201 from the read data.

In step S1703, the image forming apparatus 10 generates a pattern image.

In step S1704, the image forming apparatus 10 forms a pattern image. Specifically, the image forming apparatus 10 forms a pattern image on the recording medium, thus creating the color chart 1000 including the pattern image.

In step S1705, the image forming apparatus 10 performs reading.

In step S1706, the image forming apparatus 10 generates read data. In other words, the image forming apparatus 10 generates read data indicating, e.g., patch information as data for calibration.

In step S1707, the image forming apparatus 10 updates, e.g., the characteristic value according to the read data, thus performing adjustment.

Note that the overall process is not limited to the subject, content, and order described above. For example, an apparatus or a device other than the image forming apparatus 10 described above may perform the process. An operation other than the operations described above may be performed.

Now, a description is given of a functional configuration of an image forming apparatus according to an embodiment of the present disclosure.

Figure 18:
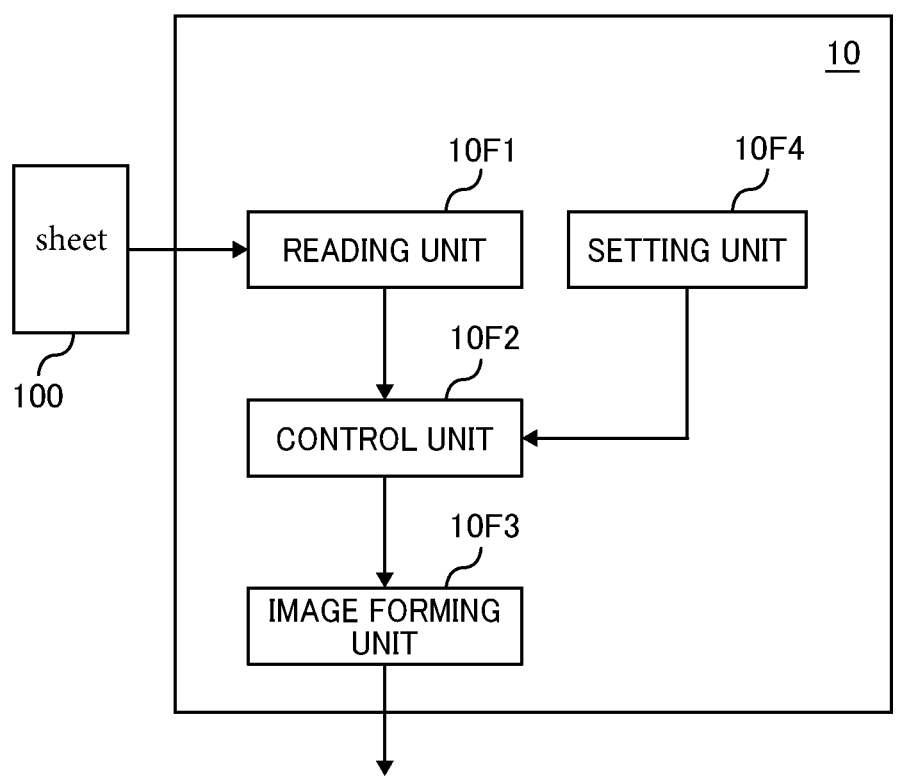
FIG. 18 is a block diagram illustrating a functional configuration of an image forming apparatus according to an embodiment of the present disclosure.

FIG. 18 is a block diagram illustrating a functional configuration of the image forming apparatus 10.

For example, the image forming apparatus 10 includes, as functional units, a reading unit 10F1, a control unit 10F2, an image forming unit 10F3, and a setting unit 10F4.

The reading unit 10F1 performs a reading procedure to read the color chart 1000. For example, the reading unit 10F1 is implemented by the reading device 17.

The control unit 10F2 performs a control procedure to perform calibration, based on data of the color chart 1000 read by the reading unit 10F1. For example, the control unit 10F2 is implemented by the control device 11.

The image forming unit 10F3 performs an image forming procedure to form an image in a state adjusted according to a result of the calibration performed by the control unit 10F2. For example, the image forming unit 10F3 is implemented by the writing device 12, the image forming device 13, the intermediate transfer belt 14, the secondary transfer device 15, and the fixing device 16.

The setting unit 10F4 performs a setting procedure to set a position of, e.g., the reference patch 201 in the color chart 1000. For example, the setting unit 10F4 is implemented by the reading device 17 or an input device.

Now, a description is given of some comparative examples.

Specifically, a description is now given of three color charts as comparative examples of the color chart 1000 according to the present embodiment.

Figure 19:
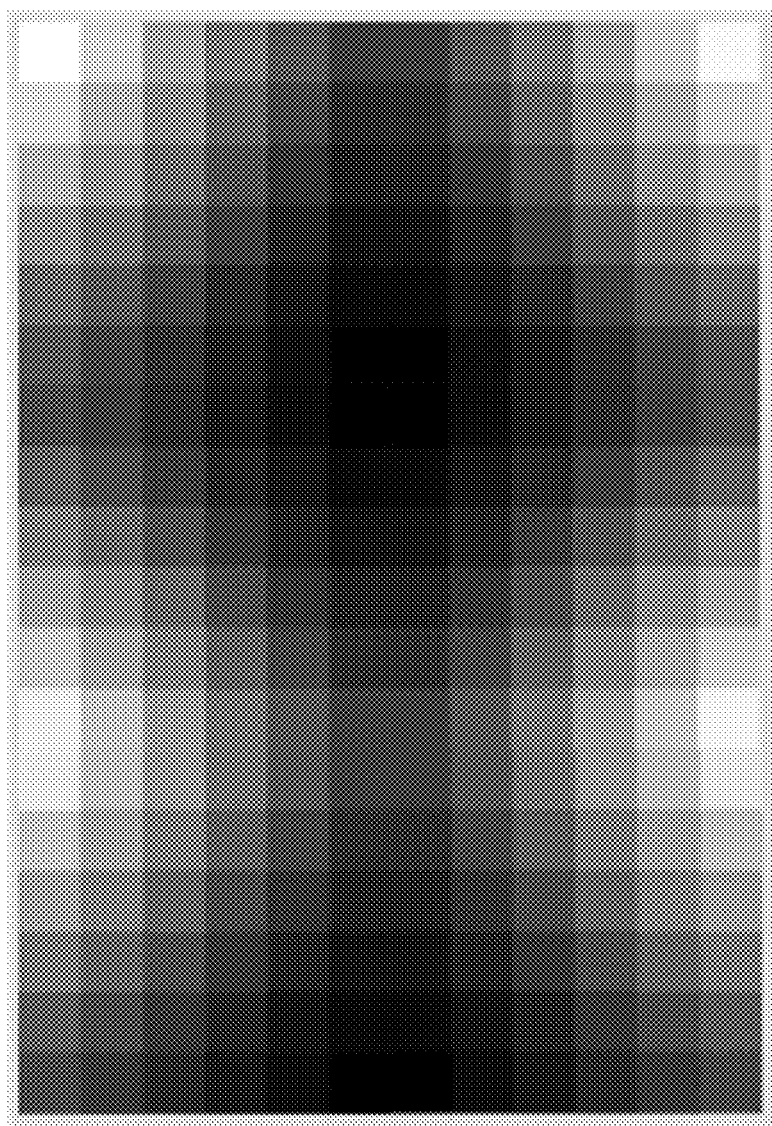
FIG. 19 is a diagram illustrating a first comparative example.

FIG. 19 is a diagram illustrating a first comparative example.

Although the patches are located such that adjacent patches are in close tones, the color chart illustrated in FIG. 19 has a relatively large difference in gradation between the patches and the background color.

Figure 20:
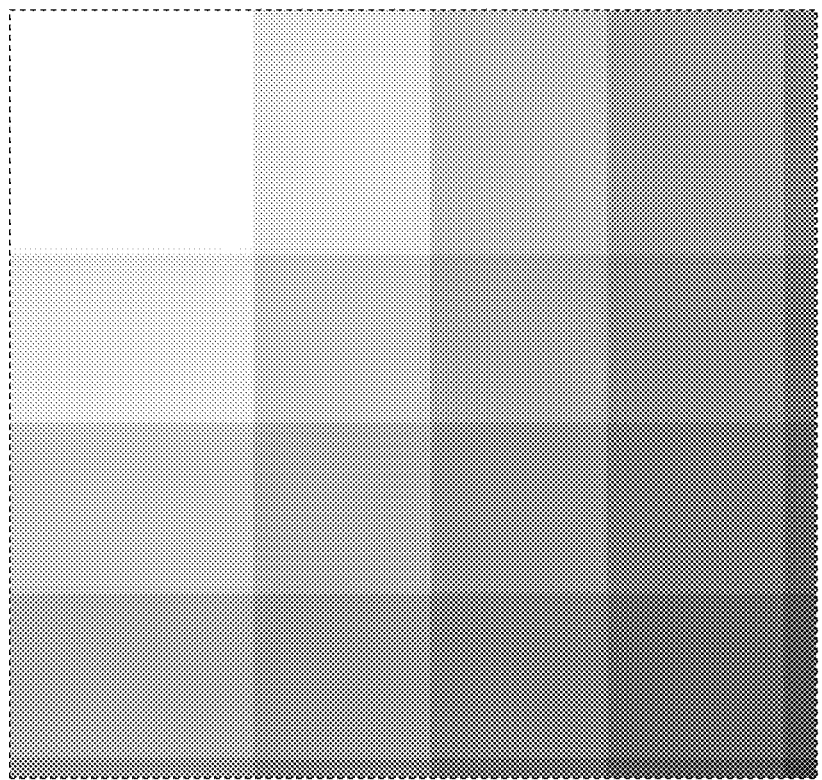
FIG. 20 is a diagram illustrating a second comparative example.

FIG. 20 is a diagram illustrating a second comparative example.

Although the outer circumferential patches have an area greater than the area of inside patches, the color chart illustrated in FIG. 20 has a relatively large difference in gradation between the patches and the background color.

Figure 21:
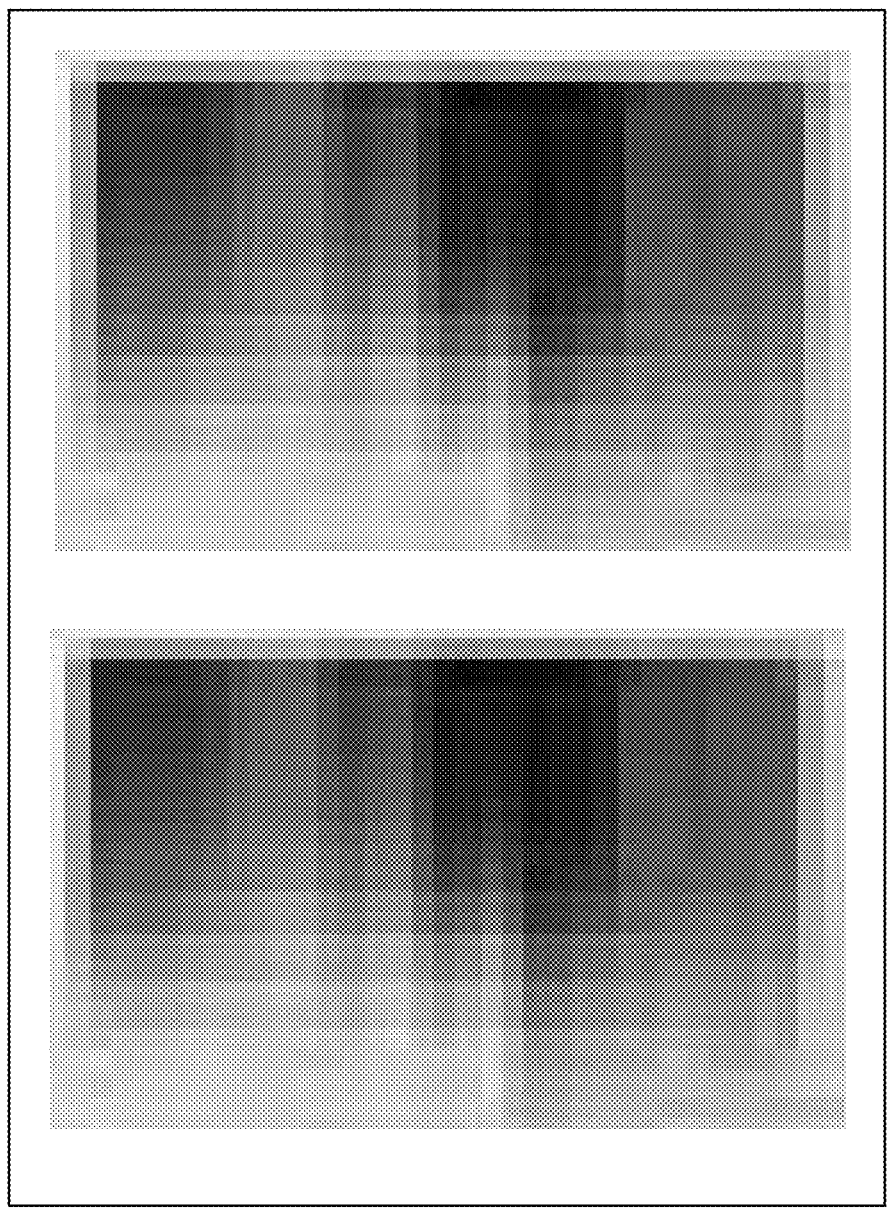
FIG. 21 is a diagram illustrating a third comparative example.

FIG. 21 is a diagram illustrating a third comparative example.

FIG. 21 illustrates an image of a color chart formed in gradation from dark to light of various colors such as yellow, magenta, cyan, black, green, and brown.

When calibration is performed with the color charts described above as the first to third comparative examples, the flare affects reading of the color charts.

Now, a description is given of other embodiments of the present disclosure.

For example, the color, location, size, and shape of patches constructing the color chart 1000 and the ratio between the patches and the margin are not limited to the examples described above.

The intermediate color may be other than red. In other words, the intermediate color is a color having a density between a color having the highest density (e.g., black) and a color having the lowest density (e.g., white).

The recording medium is, e.g., a sheet such as a sheet of plain paper. In addition to plain paper, examples of the recording medium include, but are not limited to, coated paper, label paper, an overhead projector sheet, a film, and a flexible thin plate. In other words, the recording medium (or a recording medium that is used for an inkjet image forming apparatus) is made of a material to which ink droplets are at least temporarily adherable, a material to which ink droplets adheres and fixes, or a material to which ink droplets adheres and permeate. In short, the recording medium is made of any material to which liquid is adherable, such as paper, thread, fiber, fabric, leather, metal, plastic, glass, wood, ceramic, or a combination thereof.

Specific examples of a recording material or formation made of such a material include, but are not limited to, a recording medium such as a sheet, a film, or cloth, an electronic component such as an electronic substrate or a piezoelectric element (which may be referred to as a piezoelectric component), layered powder, an organ model, and a testing cell.

According to the embodiments of the present disclosure, the image quality is enhanced.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

What is claimed is:

1. A color chart comprising:
   a first portion including no patch; and
   a second portion including a plurality of patches having different densities or luminances,
   the plurality of patches including a reference patch indicating a color having a reference density or luminance,
   the reference patch being adjacent to the first portion and being one of the outermost patches in the second portion,
   the plurality of patches being disposed in a spiral shape in order of:
   continuously increasing density of the color from the reference patch inward toward a central portion of the second portion;
   continuously decreasing density of the color from the reference patch inward toward the central portion of the second portion;
   continuously increasing luminance of the color from the reference patch inward toward the central portion of the second portion; or
   continuously decreasing luminance of the color from the reference patch inward toward the central portion of the second portion,
   wherein the central portion is a last patch of the spiral shape.

2. The color chart according to claim 1,
   wherein the reference patch has a color corresponding to a color of a recording medium.

3. The color chart according to claim 1,
   wherein the plurality of patches including the reference patch are located in a spiral shape in the second portion.

4. The color chart according to claim 3, further comprising another second portion.

5. The color chart according to claim 1,
   wherein the plurality of patches including the reference patch have identical areas.

6. The color chart according to claim 1,
   wherein the plurality of patches including the reference patch have different shapes within the same color chart.

7. The color chart according to claim 1,
   wherein the density is a value determined on a cyan, magenta, yellow, and black (CMYK) basis.

8. The color chart according to claim 1,
   wherein the luminance is a value determined on an L*a*b* (Lab) basis.

9. The color chart according to claim 1,
   wherein a difference in density between the color of the reference patch and a color of a recording medium is equal to or less than a given value.

10. An image forming apparatus comprising circuitry configured to:
    read the color chart according to claim 1;
    perform calibration, based on data of the color chart read; and
    form an image, based on a result of the calibration performed.

11. An image forming apparatus comprising circuitry configured to:
    form the color chart according to claim 1;
    read the color chart formed; and
    perform calibration, based on data of the color chart read,
    the circuitry being configured to form an image on a recording medium, based on a result of the calibration performed.

12. A reading device comprising:
    a sensor configured to read the color chart according to claim 1; and
    circuitry configured to output data of the color chart read by the sensor to an image forming apparatus configured to form an image on a recording medium.

* * * * *